United States Patent Office 3,469,985
Patented Sept. 30, 1969

3,469,985
LIGHT-ABSORBING DYES DERIVED FROM BARBITURIC AND 2 - THIOBARBITURIC ACID COMPOUNDS USEFUL FOR PHOTOGRAPHY AND THEIR PREPARATION
Joseph Bailey, Wealdstone, Harrow, England, assignor to Eastman Kodak Company, Rochester, N.Y., a corporation of New Jersey
No Drawing. Original application June 13, 1963, Ser. No. 287,530. Divided and this application Apr. 4, 1968, Ser. No. 718,911
Int. Cl. G03c 1/84
U.S. Cl. 96—84                               9 Claims

ABSTRACT OF THE DISCLOSURE

Process for preparing novel light-absorbing dyes useful, for example, in light absorbing filter layers in photography by reacting a barbituric acid or a 2-thiobarbituric acid with ethyl orthoacetate or ethyl orthopropionate, for example. Complex dyes are obtained by condensing the dyes formed as indicated above with cyanine or merocyanine dye intermediates. Derivatives are readily prepared by heating the first formed dyes with a reactant such as a primary amine, piperidine, ammonia, fuming sulfuric acid or bromine, for example.

---

This application is a division of my copending application Ser. No. 287,530, filed June 13, 1963, now Patent No. 3,417,084, issued Dec. 17, 1968.

This invention is related to dyes for photography and more particularly to new dyes derived from barbituric and thiobarbituric acid derivatives and their synthesis.

It is known that barbituric and thiobarbituric acid derivatives react with ethyl orthoformate in pyridine solution to give monomethinoxonal dyes. Such reactions are described by Brooker et al. in Journal of American Chemical Society, vol. 73, 5332 (1951).

The reaction of 1,3-dimethylbarbituric acid with ethyl orthoformate without solvent or condensing agent to give the ethoxymethylene derivative is described by J. W. Clark-Lewis and M. J. Thompson in Journal of Chemical Society, 1959, 2401. Similarly, 1,3-diethyl-2-thiobarbituric acid and ethyl orthoformate in acetic anhydride gives the ethoxymethylene derivative (R. A. Jeffreys, JCS, 1956, 2991).

It is further known that ketomethylene compounds react with orthoesters to yield alkoxyalkylidene derivatives (e.g., Kendall and Fry British Patent 544,647 and Knott, JCS, 1954, (1482).

New dyes derived from barbituric and thiobarbituric acid derivatives and methods for making these dyes are desired.

It is therefore an object of my invention to provide a new synthesis for making new dyes derived from barbituric and thiobarbituric acid derivatives.

Another object is to provide a synthesis involving the reaction of barbituric and 2-thiobarbituric acid derivatives with orthoesters other than orthoformate which takes an unexpected course yielding not the alkoxyalkylidene derivatives but instead dyes which are not monomethinoxonols.

Another object is to provide a synthesis for preparing complex dyes by reacting my dyes with cyanine and merocyanine type intermediates.

Another object of my invention is to provide new dyes for photography which are derived from barbituric and 2-thiobarbituric acid derivatives.

Another object is to provide new dyes that are valuable for use in light absorbing filter layers in photographic elements. Many of these dyes are readily bleached by alkaline solutions and photographic developing solutions.

Still another object is to provide dyes that contain a nucleophilic carbon atom.

Still further objects will be apparent from a consideration of the following specification and claims.

These and other objects are accomplished according to my invention by the new dyes prepared by my new synthesis. According to my invention valuable new dyes are prepared by heating a mixture of (1) a compound selected from the class consisting of a barbituric acid and a thiobarbituric acid, and (2) an ethylorthoacetate or an ethylorthopropionate. The dyes derived from this reaction of ethyl orthoacetate are readily converted to complex dyes by condensing them with cyanine or merocyanine type intermediates. Other derivatives of my dyes are made by treating them with various reactants.

My reaction takes an unexpected course yielding not the alkoxyalkylidene derivatives but rather dyes that are not the monomethinoxonols. Furthermore, the dyes obtained from ethylorthoacetate contain a nucleophilic carbon atom.

The barbituric and thiobarbituric acids that are used to advantage according to my invention include those represented by the formula:

(I)
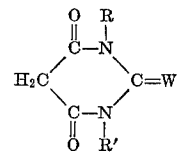

wherein R and R' each represents the same or a different group selected from the class consisting of the hydrogen atom, an alkyl group, e.g., methyl, ethyl, propyl, butyl, hexyl, benzyl, phenethyl, etc., and an aryl group, e.g., phenyl, 4-methylphenyl, etc.; and W represents the oxygen atom or the sulfur atom.

The ethylorthoacetate and ethylorthopropionate are represented to advantage by the formula:

(II)
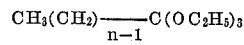

wherein $n$ represents an integer of from 1 to 2.

My dyes are made by heating a mixture of a compound of Formula I and a compound of Formula II to a temperature between room temperature and the reflux temperature of the reaction mixture.

The reaction does not require a solvent although it may be advantageous to use an inactive solvent such as pyridine, etc., or a dehydrating solvent such as acetic anhydride.

The dyes formed by heating a mixture of a compound of Formula I and a compound of Formula II are readily converted to the corresponding complex dye by heating a mixture of said dye and a cyanine or merocyanine type intermediate in a suitable solvent in the presence of a basic condensing agent. Suitable solvents include any of the conventional solvents, such as, methanol, ethanol, propanol, etc. Basic condensing agents used to advantage include for example, the trialkylamines (e.g., triethylamine, tri-n-propylamine, triisopropylamine, tri-n-butylamine, tri-sec.-butylamine, tri-tert-butylamine, tri-n-hexylamine, triisoamylamine, tri-n-amylamine, etc.), the N-alkylpiperidines (e.g., N-methylpiperidine, N-ethylpiperidine, etc.), the N,N-dialkylanilines (e.g., N,N-dimethylaniline, N,N-diethylaniline, etc.), etc. The reaction mixture is heated to the range from about room temperature to the reflux temperature for the reaction mixture.

The cyanine and merocyanine dye intermediates used to advantage in making complex dyes, includes intermediates represented by the formula:

(III) 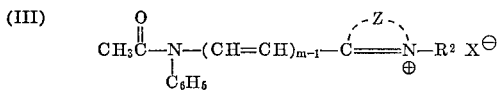

(IV) 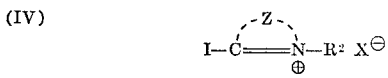

(V) 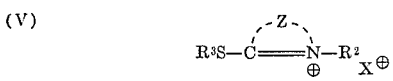

(VI) 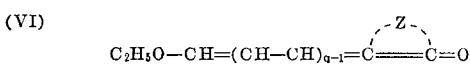

and (VII) 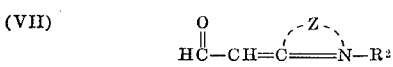

wherein $m$ represents an integer of from 1 to 3; Z represents the nonmetallic atoms necessary to complete a 5 to 6 membered heterocyclic nucleus, such as a nucleus of the thiazole series (e.g., thiazole, 4-methylthiazole, 4-phenylthiazole, 5-methylthiazole, 5-phenylthiazole, 4,5-dimethylthiazole, 4,5 - diphenylthiazole, 4 - (2-thienyl)-thiazole, etc.), a nucleus of the benzothiazole series (e.g., benzothiazole, 4-chlorobenzothiazole, 5-chlorobenzothiazole, 7-chlorobenzothiazole, 4-methylbenzothiazole, 5-methylbenzothiazole, 6 - methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6 - iodobenzothiazole, 4 - ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6 - hydroxybenzothiazole, etc.), a nucleus of the naphthothiazole series (e.g., α-naphthothiazole, β-naphthothiazole, 5-methoxy-β-naphthothiazole, 5-ethoxy-β-naphthothiazole, 6 - methoxy-α-naphthothiazole, 7-methoxy-α-naphthothiazole, etc.), a nucleus of the thianaphtheno-7′,6′,4,5-thiazole series (e.g., 4′-methoxythianaphtheno-7′,6′,4,5-thiazole, etc.), a nucleus of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a nucleus of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,5-dimethylbenzoxazole, 5-methoxybenzoxazole, 5-ethoxybenzoxazole, 5 - chlorobenzoxazole, 6-methoxybenzoxazole, 5-hydroxybenoxazole, 6-hydroxybenzoxazole, etc.), a nucleus of the naphthoxazole series e.g., α-naphthoxazole, β-naphthoxazole, etc.), a nucleus of the selenazole series (e.g., 4-methylselenazole, 4-phenylselenazole, etc.), a nucleus of the benzoselenazole series (e.g., benzoselenazole, 5 - chlorobenzoselenazole, 5 - methoxybenzoselenazole, 5-hydroxybenzoselenazole, tetrahydrobenzoselenazole, etc.), a nucleus of the naphthoselenazole series (e.g., α-naphthoselenazole, β-naphthoselenazole, etc.), a nucleus of the thiazoline series (e.g., thiazoline, 4-methylthiazoline, etc.), a nucleus of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a nucleus of the 4-quinoline series (e.g., quinoline, 6 -methoxyquinoline, 7-methylquinoline, 8-methylquinoline, etc.), a nucleus of the 1-isoquinoline series (e.g., isoquinoline, 3,4-dihydroisoquinoline, etc.), a nucleus of the 3-isoquinoline series (e.g., isoquinoline, etc.), a nucleus of the benzimidazole series (e.g., 1,3-diethylbenzimidazole, 1-ethyl-3-phenylbenzimidazole, 1,3 - diethyl-5-ethylcarbamylbenzimidazole, 5-acetyl-1,3-diethylbenzimidazole, 5-bromo-1,3-diethylbenzimidazole, 5-chloro-1,3-diethylbenzimidazole, etc.), a nucleus of the 3,3-dialkylindolenine series (e.g., 3,3-diethylindolenine, 3,3,5 - trimethylindolenine, 3,3,7-trimethylindolenine, etc.), a nucleus of the pyridine series (e.g., pyridine, 5-methylpyridine, etc.), etc.; $R^2$ represents an alkyl group, e.g., methyl, ethyl, propyl, butyl, β-sulfoethyl, 4-sulfobutyl, 4-carboxyethyl, phenethyl, benzyl, etc., or an aryl group, e.g., phenyl, 4-methylphenyl, 4-methoxyphenyl, etc.; $q$ represents an integer of from 1 to 2; Q represents the nonmetallic atoms necessary to complete a 5 to 6 membered heterocyclic nucleus selected from the class consisting of those of the pyrazolone series (e.g., 3-methyl-1-pheynl-5-pyrazolone, 1-phenyl-5-pyrazolone, 1,(2-benzothiazolyl)-3-methyl-5-pyrazolone, etc.), those of the isoxazolone series (e.g., 3-phenyl-5(4H)isoxazolone, 3-methyl-5(4H)isoxazolone, etc.), those of the oxindole series (e.g., 1-alkyl-2,3-dihydro-2-oxindoles, etc.), those of the barbituric acid series (e.g., barbituric acid or 2-thiobarbituric acid as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3 - di - (β-methoxyethyl), etc.), or 1,3-diaryl (e.g., 1,3-diphenyl, 1,3-di-(p-chlorophenyl), 1,3-di-(p-ethoxycarbonylphenyl), etc.), or 1-aryl (e.g., 1-phenyl, 1-p-chlorophenyl, 1-p-ethoxycarbonylphenyl), etc.), or 1-alkyl-3-aryl (e.g., 1-ethyl-3-phenyl, 1-n-heptyl-3-phenyl, etc.) derivatives), those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2(3H)-imidazo[1,2-a]pyridone series, those of the 5,7-dioxo-6,7-dihydro-5-thiazolo[3,2-a]pyrimidine series (e.g., 5,7-dioxo-3-phenyl-6,7 - dihydro-5-thiazolo[3,2-a]pyrimidine, etc.), those of the 2-thio-2,4-oxazolidinedione series (i.e., those of the 2-thio-2,4(3H,5H)-oxazoledione series) (e.g., 3-ethyl-2-thio-2,4-oxazolidinedione, etc.), those of the thianaphthenone series (e.g., 3(2H)-thianaphthenone, etc.), those of the 2-thio-2,5-thiazolidinedione those of the 2,4-thiazolidinedione series (e.g., 2,4-thiazolidinedione series (i.e., the 2-thio-2,5(3H,4H)-thiazoledione series) (e.g., 3-ethyl-2-thio-2,5-thiazolidinedione, etc.), dinedione, 3-ethyl-2,4-thiazolidinedione, 3 - phenyl-2,4-thiazolidinedione, 3-α-naphthyl - 2,4 - thiazolidinedione, etc.), those of the thiazolidinone series (e.g., 4-thiazolidinone, 3-ethyl-4-thiazolidinone, 3-phenyl-4 - thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series (e.g., 2,4-imidazolinedione, 3-ethyl-2,4-imidazolinedione, 3-phenyl-2,4 - imidazolinedione, 3-α-naphthyl-2,4-imidazolinedione, 1,3-diethyl-2,4-imidazolinedione, 1-ethyl-3-α-naphthyl-2,4 - imidazolinedione, 1,3-diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4 - imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl-3-α-naphthyl - 2 - thio,2,4-imidazolinedione, 1,3-diphenyl-2-thio-2,4 - imidazolinedione, etc.), those of the 5-imidazolinone series (e.g., 2-n-propylmercapto-5-imidazolinone, etc.), etc., as well as heterocyclic nuclei containing a sulfone group, such as those described in U.S. Patent 2,748,114, issued May 29, 1956 (e.g., 4-thiazolidone-1,1-dioxide, 3(2H)-thianaphthenone-1,1-dioxide, etc.) (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom); $R^3$ represents an alkyl group (e.g., methyl, ethyl, propyl, etc.) or an aryl group (e.g., phenyl, tolyl, etc.); and $X^\ominus$ represents an acid anion, e.g., chloride, bromide, iodide, thiocyanate, sulfamate, methylsulfate, ethylsulfate, perchlorate, benzenesulfonate, p-toluenesulfonate, etc.

Derivatives of my dyes formed by condensing a compound of Formula I with a compound of Formula II are readily prepared by heating a mixture of the dye and a reactant such as a primary amine, e.g., aniline, ethylamine, propylamine, etc., piperidine, ammonia, fuming sulfuric acid, bromine, etc. Fuming sulfuric acid serves as the solvent for the reaction using this material. Suitable organic solvents, such as methanol, ethanol, propanol, chloroform and other well-known solvents are used to advantage in the reactions using the other reactants listed above. It is advantageous to carry out the reaction at a temperature between room temperature and the reflux temperature for the reaction mixture.

The structure of the dyes formed by condensing a compound of Formula I with a compound of Formula II are not known with certainty. The following general structures are proposed but it should be understood that the dyes, in fact, may have isomeric structures other than those shown below.

(A) The structures for the reaction products of 1,3-dialkylbarbituric or 2-thiobarbituric acids with ethylorthoacetate or ethylorthopropionate are illustrated with the proposed structures for the product of the condensation of 1,3-diethylbarbituric acid and ethylorthoacetate:

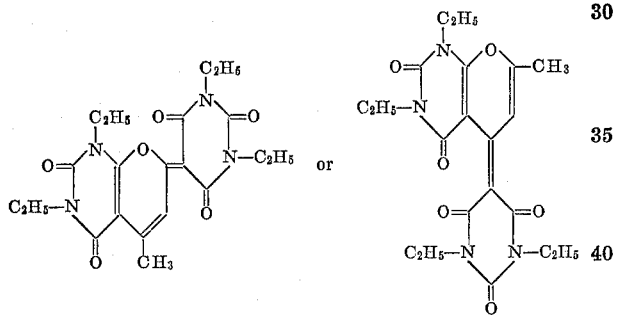

In these structures the carbon of the methyl group is nucleophilic and is reactive with merocyanine and cyanine dye intermediates, such as those of Formulas III, IV, V, VI and VII to produce the corresponding complex dye, or with materials, such as fuming sulphuric acid, bromine, etc., to produce the corresponding derivative. It is believed that bases such as aniline, ethylamine, ammonia, piperidine react at the hetero oxygen atom.

(B) The proposed structure for the condensation product of 1,3-diethyl-2-thiobarbituric acid with ethylorthoacetate in pyridine is:

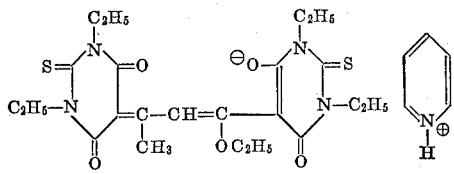

The following specific syntheses are representative of the reactions of my invention and will serve to further illustrate but not limit my invention.

DYE I.—REACTION PRODUCT OF 1,3-DIETHYLBARBITURIC ACID AND ETHYLORTHOACETATE (a) 1,3-diethylbarbituric acid (4.6 g.), ethylorthoacetate (5 cc.) and acetic anhydride (10 cc.) were heated on a steam bath for 1½ hrs. and then excess solvent was distilled off. The residual oil was taken up in ligroin (B.P. 80–100°) and chilled for 48 hrs. The crystals which separated were collected and washed with methanol. The product was recrystallized from methanol. It could be obtained either as long fluffy yellow needles or as hard yellow rods depending on the rate of cooling of the methanol solution. The yield was 0.3 g., M.P. 195° C.

(b) 1,3-diethylbarbituric acid (4.6 g.) and ethylorthoacetate (5 cc.) were heated under reflux for 1 hr. On chilling the reaction mixture, yellow crystals, was deposited. The dye was recrystallized from methanol. The yield was 0.3 g., M.P. 195° C. The absorption curve of dyes obtained in (a) and (b) were identical.

(c) Repeat of (b) except that volatile reaction products were removed through a fractionation column. In this way the dye yield was increased to 1.4 g.

The dye melted at 195° C. It had an absorption maximum in methanol at 439 m$\mu$.

(d) 1,3-diethylbarbituric acid (5 g.), ethylorthoacetate (5 cc.) and pyridine (10 cc.) were heated under reflux for 10 minutes. After chilling overnight the solid reaction product was collected and washed with methanol and then recrystallized from methanol yielding 0.7 g. Analysis and absorption spectrum show the product to be identical to reaction products of syntheses (a), (b) and (c).

DYE 2.—REACTION PRODUCT OF 1,3-DIETHYL-2-THIOBARBITURIC ACID AND ETHYLORTHOACETATE 1,3-diethyl-2-thiobarbituric acid (20 g.) and ethylorthoacetate (25 cc.) were heated under reflux for ¾ hr. The dye which separated on chilling was collected and washed with ethanol. It was recrystallized from ethanol as yellowish-brown needles and weighed 4.5 g.

The dye melted at 200° C. It had an absorption maximum in ethanol at 475 m$\mu$.

DYE 3.—REACTION PRODUCT OF 1,3-DIETHYL-2-THIOBARBITURIC ACID AND ETHYLORTHOACETATE IN PYRIDINE 1,3-diethyl-2-thiobarbituric acid (4 g.), ethylorthoacetate (5 cc.) and pyridine (10 cc.) were heated under reflux for 5 minutes. On chilling dye crystals separated. The product was collected and washed with a little pyridine. A second crop of crystals was obtained by addition of a little ether to the pyridine filtrate. The combined crops were twice recrystallized from ethanol. The dye had an absorption maximum in ethanol at 494 m$\mu$, M.P. 154° C.

DYE 4.—REACTION PRODUCT OF 1,3-DIMETHYLBARBITURIC ACID WITH ETHYLORTHOACETATE (a) 1,3-dimethylbarbituric acid (46 g.), ethylorthoacetate (120 cc.) were heated to boiling and low boiling reaction products were removed by distillation. The mixture was heated for 30 minutes during which time dye separated from solution. The mixture was chilled and the solid product was collected by filtration. It was recrystallized from benzene as short yellow needles which fluoresced strongly under U.V. light. The yield of crystals was 15 g., M.P. 277° C., $\lambda$ max. in chloroform was at 451 m$\mu$ and in pyridine was at 453 m$\mu$.

(b) 1,3-dimethylbarbituric acid (15.6 g.), ethylorthoacetate (20 cc.) and pyridine (40 cc.) were heated under reflux for 30 minutes. On chilling golden yellow shiny platelets were deposited. The product was collected and washed with methanol. It was recrystallized from benzene yielding 3 g. Analysis and absorption spectrum show this product to be identical to the reaction product of synthesis (a).

DYE 5.—REACTION PRODUCT OF 1,3-DIETHYLBARBITURIC ACID WITH ETHYLORTHOPROPIONATE 1,3-diethylbarbituric acid (4.6 g.) and ethylorthopropionate (7 cc.) were heated under reflux for ¾ hr. On chilling orange crystals were deposited. These were collected and recrystallized from methanol. The yield of dye was 0.05 g.

The dye melted at 212° C. It had an absorption maximum in methanol at 468 mμ.

The following syntheses will illustrate how the above dyes are reacted to form complex dyes.

DYE 6.—REACTION PRODUCT OF DYE 1 WITH 2,2'-ACETANILIDOVINYLBENZOXAZOLE ETHIODIDE

Dye 1 (0.2 g.), 2,2-acetanilidovinylbenzoxazole ethiodide (0.22 g.), ethanol (5 cc.) and triethylamine (0.2 cc.) were heated under reflux for 5 minutes. On chilling, green crystals were deposited. The dye was purified by recrystallization from pyridine-methanol mixture. It was obtained as dark green crystals and weighed 0.12 g.

It melted at 267° C. It had absorption maximum in acetone at 612 mμ; in pyridine at 622 mμ and in 50% aqueous pyridine at 605 mμ.

DYE 7.—REACTION PRODUCT OF DYE 1 WITH 2-ETHYLTHIOBENZTHIAZOLE ETHO-p-TOLUENESULPHONATE

Dye 1 (0.2 g.), 2-ethylthiobenzthiazole etho-p-toluenesulphonate (0.2 g.), ethanol (20 cc.) and triethylamine (0.2 cc.) were heated under reflux for 15 minutes. Ethylmercaptan was given off. Reaction mixture was chilled, the dye was collected and washed well with ethanol. It was recrystallized from pyridine as bright orange-red crystals and the product weighed 0.18 g.

The dye melted at 319° C. It had absorption maximum in acetone at 523 mμ; in pyridine at 530 mμ and in 50% aqueous pyridine at 521 mμ.

DYE 8.—REACTION PRODUCT OF DYE 2 WITH 2-ETHYLTHIOBENZTHIAZOLE ETHO-p-TOLUENESULPHONATE

Dye 2 (0.34 g.), 2-ethylthiobenzthiazole etho-p-toluenesulphonate (0.2 g.), ethanol (30 cc.) and triethylamine (0.21 cc.) were heated under reflux for 15 minutes. The reaction mixture was chilled and the separated dye was then collected. It was recrystallized from pyridine. The purified material was suspended in boiling methanol and filtered hot. The dye was finally washed with methanol. After drying it weighed 0.12 g.

The dye melted at 333° C. It had an absorption maximum in pyridine at 548 mμ.

DYE 9.—REACTION PRODUCT OF DYE 1 WITH 2-IODOQUINOLINE ETHIODIDE

Dye 1 (0.4 g.), 2-iodoquinoline ethiodide (0.4 g.), ethanol (50 cc.) and triethylamine (0.3 cc.) were heated under reflux for 15 minutes. After chilling the dye was collected and washed with ethanol. It was recrystallized from ethanol as dark red fluffy crystals. The product weighed 0.35 g.

The dye melted at 263° C. It had an absorption maximum in pyridine at 585 mμ; in ethanol at 539 mμ.

DYE 10.—REACTION PRODUCT OF DYE 2 WITH 2-IODOQUINOLINE ETHIODIDE

Dye 2 (0.45 g.), 2-iodoquinoline ethiodide (0.4 g.), ethanol (50 cc.) and triethylamine (0.3 cc.) were heated under reflux for 15 minutes. After chilling the dye was collected and washed well with ethanol. It was recrystallized from pyridine. The product was obtained as maroon crystals and weighed 0.26 g.

The dye melted at 277° C. It had an absorption maximum in pyridine at 590 mμ.

DYE 11.—REACTION PRODUCT OF DYE 1 WITH 5-ETHOXYMETHYLENE-1,3-DIETHYLBARBITURIC ACID

Dye 1 (0.42 g.), 5-ethoxymethylene-1,3-diethylbarbituric acid (0.24 g.), ethanol (5 cc.) and triethylamine (0.3 cc.) were heated under reflux for 10 minutes. The reaction mixture was then chilled and diluted with water (20 cc.) and made slightly acid with concentrated hydrochloric acid. The dye which separated was slightly sticky but hardened on chilling. It was collected and washed with water. The dye weighed 0.35 g. melted at 99° C. and had an absorption maximum in methanol (plus triethylamine to ensure complete ionization) at 554 mμ.

DYE 12.—REACTION PRODUCT OF DYE 1 WITH 2,4'-ACETANILIDOBUTADIENYLBENZOXAZOLE ETHIODIDE

Dye 1 (0.4 g.), 2,4'-acetanilidobutadienylbenzoxazole ethiodide (0.46 g.), ethanol (30 cc.) and triethylamine (0.5 cc.) were heated under reflux for 10 minutes. The reaction mixture was chilled and the dye product was collected by filtration and washed well with ethanol. After drying the product weighed 0.18 g., M.P. 173° C. The dye in chloroform had an absorption maximum at 697 mμ; in pyridine at 703 mμ.

The following dyes will illustrate other derivatives and their synthesis from dyes produced by condensing compounds of Formula I with compounds of Formula II.

DYE 13

Dye 1 (0.4 g.), aniline (0.5 cc.) and ethanol (75 cc.) were heated under reflux for 30 minutes. The mixture was cooled and diluted dropwise with water until crystallization began. The mixture was chilled, stood overnight, collected by filtration and dried. It was suspended in a small amount of benzene and filtered. The residue (A) (0.04 g.), M.P. 202° C. with darkening at 193° C., consisted of orange-red crystals with intense bright red fluorescence under U.V. light. It had an absorption maximum in methanol at 491 mμ and in chloroform at 511 mμ. The benzene filtrate was concentrated to dryness and the residue was recrystallized from methanol giving colorless needles (B) (0.2 g.), M.P. 172–173° C., which had an absorption maximum in methanol at 312 mμ.

DYE 14.—REACTION PRODUCT OF DYE 4 WITH FUMING SULPHURIC ACID

Dye 4 (3.6 g) dissolved in a mixture of concentrated sulphuric acid (10 cc.) and 20% oleum (8 cc.) were heated on a steam bath for 13 hours. The mixture was then chilled and poured into water (200 cc.) and treated with solid sodium carbonate when the sodium salt of the product separated. This was collected and dissolved in hot ethanol and the dye product was precipitated from solution by acidification with acetic acid. The dye was collected by filtration, dried, and weighed 1.2 g. The dye in water had an absorption maximum at 457 mμ.

DYE 15.—REACTION PRODUCT OF DYE 4 WITH BROMINE

Dye 4 (0.9 g.) in chloroform (35 cc.) was treated with bromine (0.5 cc.) and the solution was refluxed for 3 hours, during which time hydrogen bromide was evolved. The solution was concentrated and the residue was recrystallized from benzene yielding 0.6 g., M.P. 260° C. with decomposition (darkening at 249°)., λ max. in pyridine solution was at 444 mμ.

DYE 16.—REACTION PRODUCT OF DYE 4 WITH AMMONIA

Dye 4 (0.5 g.), methanol (40 cc.) and 0.88 ammonia (20 cc.) were stirred together until the dye had gone into solution. The reaction mixture was heated and the methanol and excess ammonia were distilled off leaving a pale yellow product which was recrystallized from benzene. The obtained pale yellow crystals (0.2 g.), M.P. >330° C., has an intense yellow fluorescence under U.V. light. The product had an absorption maximum in chloroform at 394 mμ.

DYE 17.—REACTION PRODUCT OF DYE 4 WITH ETHYLAMINE

Dye 4 (0.5 g.), ethanol (15 cc.), water (5 cc.) and alcoholic ethylamine (33% solution, 10 cc.) were heated on a steam bath until all the solid dye had dissolved. The excess of ethylamine and solvents were distilled off. The residue was dissolved in boiling water and, after chilling, the crystals were collected by filtration and twice recrystallized from water as nearly colorless crystals which were fluorescent under U.V. light. The product had an absorption maximum in chloroform at 302 m$\mu$, in water at 299 m$\mu$ and in methanol at 302 m$\mu$, M.P. 128° C.

DYE 18.—REACTION PRODUCT OF DYE 4 WITH PIPERIDINE

Dye 4 (0.5 g.), piperidine (0.5 cc.), methanol (10 cc.) were heated on a steam-bath for 1¾ hr. during which time all the solid went into solution. The reaction mixture was chilled and stirred with petroleum ether (B.P. 60–80°) and the mixture stood; the two layers formed were separated. The solvent was distilled off from the layer containing the dye and gummy residue was treated with ethyl acetate which caused the gum to solidify. The product was collected by filtration and washed with ethyl acetate. The yield was 0.6 g., M.P. 180° C. The dye in methanol had absorption maxima at 428 m$\mu$ and at 334 m$\mu$.

Certain of my dyes are valuable for use in filter layers in photographic elements while other dyes of my invention are useful as sensitizers for silver halide emulsions. Dyes 1, 2, 3, 4, 5, 6, 11, 12, 14 and 15 are bleached by photographic developer solutions, and dyes 1, 2, 3, 4, 5, 14 and 15 are bleached by aqueous solutions of organic bases e.g., piperadine.

For the preparation of filter, overcoating or antihalation layers for photographic elements, the dyes are dissolved in suitable solvents such as water, methanol, ethanol, acetone, Cellosolve, etc. The dye solution is then added to a solution of a hydrophilic binder material, such as gelatin or other protein material, collodion, gum arabic or synthetic vehicle, such as polyvinyl alcohol and coated on the element. The optimum concentration of the dye used in the binder will depend upon the particular dye and the effect desired by the filtering layer and can be readily determined by methods well known in the art. The photographic element can contain any of the usual light-sensitive silver halide emulsion layers coated on supports, such as, cellulose nitrate, cellulose acetate, synthetic resinous material, glass, paper, etc.

The following representative examples will illustrate use of my dyes as antihalation dyes on photographic plates.

Example 1

Dye 4 was coated on glass in polyvinylphthalate as a binder at the rate of 20 mg. of dye per sq. ft. The dried coating had a $\lambda$ max. at 444 m$\mu$. The dye was bleached upon processing in a developer having the composition:

|  | G. |
|---|---|
| p-methylaminophenol sulfate | 2.2 |
| Hydroquinone | 8.8 |
| Sodium sulfite (anhydrous) | 72.0 |
| Sodium carbonate (anhydrous) | 48.0 |
| Potassium bromide | 4.0 |
| Water to 1.0 liter. | |

Example 2

Dye 2 was coated on glass in polyvinylphthalate as a binder at the rate of 15 mg. of dye per sq. ft. The dried coating had a $\lambda$ max. at 483 m$\mu$. The dye was bleached upon treatment in the developer of Example 1.

Example 3

Dye 6 was coated on glass in polyvinylphthalate as a binder at the rate of 15 mg. of dye per sq. ft. The dried coating absorbed visible light in the region of 420–620 m$\mu$ with a peak at 606 m$\mu$. The dye was removed on processing in a developer made by adding 1 part of water to 2 parts of a solution having the composition:

|  | G. |
|---|---|
| Sodium sulfite (anhydrous) | 90.0 |
| Hydroquinone | 45.0 |
| Sodium hydroxide | 37.5 |
| Potassium bromide | 30.0 |
| Water to make 1.0 liter. | |

Example 4

Dye 14 was coated at the rate of 20 mg. per sq. ft. in polyvinyl alcohol as a binder on glass to give a coating, which after drying had an absorption maximum at 465 m$\mu$. The dye was bleached on processing in a developer having the composition:

|  | G. |
|---|---|
| p-aminophenol sulfate | 2.0 |
| Sodium sulfite (anhydrous) | 100.0 |
| Hydroquinone | 5.0 |
| Sodium tetraborate | 2.0 |
| Water to 1.0 liter. | |

The following example will illustrate the silver halide emulsion sensitizing effects characterized by certain of my dyes.

Example 5

A gelatino-silver bromoiodide emulsion containing a sensitzing amount of Dye 8 was coated on a conventional support and dried. The element was exposed in a spectrophotometer. The wedge spectrogram photographically developed showed that the emulsion was sensitized to 600 m$\mu$ with a peak at 578 m$\mu$.

Valuable new dyes for use in photography are made according to my invention by the condensation of barbituric and thiobarbituric acid derivatives with ethylorthoacetate or ethylorthopropionate. This synthesis unexpectedly gives dyes which are not alkoxyalkylidene derivatives are not monomethinoxonol dyes. My dyes are readily converted to complex dyes by condensing them with cyanine or merocyanine type intermediates, or alternatively other derivatives can be made of the dyes by treating them with reactive material such as aniline, ethylamine, ammonia, piperidine, fuming sulfuric acid, bromine, etc.

The invention has been described in detail with particular reference to preferred embodiments thereof but it will be understood that variations and modifications can be effected within the spirit and scope of the invention as described hereinabove and as defined in the appended claims.

I claim:

1. A light-sensitive photographic element containing a support, at least one hydrophilic colloid layer containing a light-sensitive silver halide emulsion and at least one hydrophilic colloid layer containing a dye formed by heating a mixture consisting essentially of:

(1) a compound having the formula:

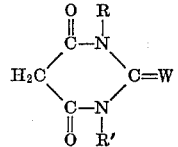

wherein R and R' each represents a member selected from the class consisting of the hydrogen atom, an alkyl group, an aralkyl group and a monocyclic aryl nucleus of the benzene series; and W represents a member selected from the class consisting of the oxygen atom and the sulfur atom; and (2) a compound having the formula:

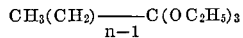

wherein $n$ is an integer of from 1 to 2, either with or without an inert solvent at a temperature between room temperature and the reflux temperature of the reaction mixture.

2. A light-sensitive photographic element in accordance with claim 1 wherein the hydrophilic colloid present in the hydrophilic colloid layers is gelatin.

3. A light-sensitive photographic element containing a support, at least one hydrophilic colloid layer containing a light-sensitive silver halide emulsion and at least one hydrophilic colloid layer containing a dye formed by heating a mixture consisting essentially of:

(1) a compound having the formula:

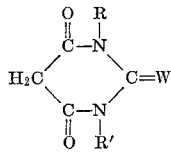

wherein R and R' each represents a member selected from the class consisting of the hydrogen atom, an alkyl group, an aralkyl group and a monocyclic aryl nucleus of the benzene series; and W represents a member selected from the class consisting of the oxygen atom and the sulfur atom; and (2) a compound having the formula:

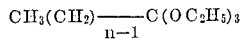

wherein $n$ is an integer of from 1 to 2, either with or without an inert solvent at a temperature between room temperature and the reflux temperature of the reaction mixture; and (3) heating the dye compound thus formed with a reactant selected from the group consisting of a primary amine, piperidine, ammonia, fuming sulfuric acid and bromine.

4. A light-sensitive photographic element containing a support, at least one hydrophilic colloid layer containing a light-sensitive silver halide emulsion and at least one hydrophilic colloid layer containing a dye formed by the process consisting essentially of the steps of:

(1) heating a mixture consisting essentially of
   (a) a compound having the formula:

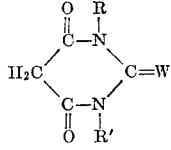

wherein R and R' each represents a member selected from the class consisting of the hydrogen atom, an alkyl group, an aralkyl group and a monocyclic aryl nucleus of the benzene series; and W represents a member selected from the class consisting of the oxygen atom and the sulfur atom; and (b) a compound having the formula:

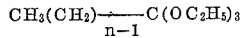

wherein $n$ is an integer of from 1 to 2 and wherein said process is carried out either with or without the use of an inert solvent at a temperature between room temperature and the reflux temperature of the reaction mixture; and (2) heating in the presence of a solvent and a basic condensing agent, a mixture consisting essentially of the dye formed in step (1) and an intermediate selected from the class consisting of those having the formulae:

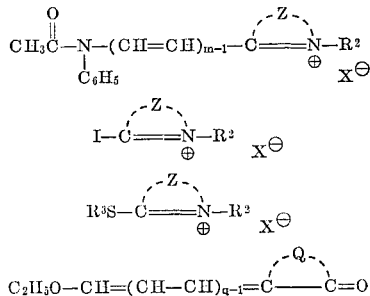

and

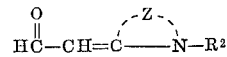

wherein $m$ represents an integer of from 1 to 3; Z represents the nonmetallic atoms necessary to complete a 5 to 6 membered nucleus selected from the class consisting of a thiazole nucleus, a benzothiazole nucleus, a naphthothiazole nucleus, a thianapheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a benzimidazole nucleus, a 3,3-dialkylindolenine nucleus and a pyridine nucleus; $R^2$ represents a group selected from the class consisting of an alkyl group and an aryl group; $X^\ominus$ represents an acid anion; $R^3$ represents a group selected from the class consisting of an alkyl group and an aryl group; $q$ represents an integer of from 1 to 2; Q represents the nonmetallic atoms necessary to complete a 5 to 6 membered heterocyclic nucleus selected from the class consisting of a pyrazolone nucleus, an isoxazolone nucleus, an oxindole nucleus, a barbituric acid nucleus, a thiobarbituric acid nucleus, a rhodanine nucleus, a 2(3H)-imidazo-[1,2-a]pyridone nucleus, a 5,7-diazo-6,7-dihydro-5-thiazolo[3,2-a]pyrimidine nucleus, a 2-thio-2,4-oxazolidine-dione nucleus, a thianaphthenone nucleus, a 2-thio-2,5-thiazolidinedione nucleus, a 2,4-thiazolidinedione nucleus, a thiazolidinone nucleus, a 4-thiozolinone nucleus, a 2-imino,2,4-oxazolinone nucleus, a 2,4-imidazolinedione nucleus, a 2-thio-2,4-imidazolinedione nucleus and a 5-imidazolinone nucleus.

5. A light-sensitive photographic element in accordance with claim 1 wherein the dye present is formed by heating a mixture consisting essentially of 1,3-dimethylbarbituric acid and ethylorthoacetate either with or without the use of an inert solvent at a temperature between room temperature and the reflux temperature of the reaction mixture.

6. A light-sensitive photographic element in accordance with claim 1 wherein the dye present is formed by heating a mixture consisting essentially of 1,3-diethyl-2-thiobarbituric acid and ethylorthoacetate either with or without the use of an inert solvent at a temperature between room temperature and the reflux temperature of the reaction mixture.

7. A light-sensitive photographic element in accordance with claim 1 wherein the dye present is formed by heating a mixture consisting essentially of 1,3-diethylbarbituric acid and ethylorthoacetate either with or without the use of an inert solvent at a temperature between room temperature and the reflux temperature of the reaction mixture and heating the dye compound thus formed with 2,2' acetanilidovinylbenzoxazole ethiodide.

8. A light-sensitive photographic element in accordance with claim 1 wherein the dye present is formed by heating a mixture consisting essentially of 1,3-dimethylbarbituric acid and ethylorthoacetate either with or without the use of an inert solvent at a temperature between room temperature and the reflux temperature of the reaction mixture and heating the dye compound thus formed with fuming sulfuric acid.

9. A light-sensitive photographic element in accordance with claim 1 wherein the dye present is formed by heating a mixture consisting essentially of 1,3-diethyl-2-thiobarbituric acid and ethylorthoacetate either with or without the use of an inert solvent at a temperature between room temperature and the reflux temperature of the reaction mixture and heating the dye compound thus formed with 2-ethylthiobenzothiazole etho-p-toluenesulfonate.

References Cited

FOREIGN PATENTS 519,895   4/1940   Great Britain.

NORMAN G. TORCHIN, Primary Examiner

RONALD H. SMITH, Assistant Examiner